US012498110B2

(12) United States Patent
Godsell

(10) Patent No.: US 12,498,110 B2
(45) Date of Patent: Dec. 16, 2025

(54) AREA LIGHT

(71) Applicant: Southwire Company, LLC, Carrollton, GA (US)

(72) Inventor: Thomas Godsell, Carrollton, GA (US)

(73) Assignee: Southwire Company, LLC

( * ) Notice: Subject to any disclaimer, the term of this patent is extended or adjusted under 35 U.S.C. 154(b) by 0 days.

(21) Appl. No.: 18/702,741

(22) PCT Filed: Oct. 20, 2022

(86) PCT No.: PCT/US2022/078451

§ 371 (c)(1),
(2) Date: Apr. 18, 2024

(87) PCT Pub. No.: WO2023/070046

PCT Pub. Date: Apr. 27, 2023

(65) Prior Publication Data

US 2025/0035295 A1 Jan. 30, 2025

Related U.S. Application Data

(60) Provisional application No. 63/270,161, filed on Oct. 21, 2021.

(51) Int. Cl.

| | |
|---|---|
| *F21V 23/06* | (2006.01) |
| *F21V 15/01* | (2006.01) |
| *F21V 15/02* | (2006.01) |
| *F21V 21/08* | (2006.01) |

(Continued)

(52) U.S. Cl.
CPC .............. *F21V 23/06* (2013.01); *F21V 15/01* (2013.01); *F21V 15/02* (2013.01); *F21V 21/0832* (2013.01); *F21V 23/04* (2013.01); *F21V 31/005* (2013.01)

(58) Field of Classification Search
CPC .......... F21V 23/06; F21V 23/04; F21V 15/01; F21V 15/02; F21V 21/0832; F21V 31/005
See application file for complete search history.

(56) References Cited

U.S. PATENT DOCUMENTS 10,753,590 B1 * 8/2020 Deng .................... F21V 31/005
10,871,276 B1 * 12/2020 Lan ....................... F21V 17/002

(Continued)

FOREIGN PATENT DOCUMENTS

KR 200387209 Y1 6/2005
KR 20100115152 A * 10/2010

OTHER PUBLICATIONS

International Search Report and Written Opinion issued in PCT/US2022/078451 (Feb. 27, 2023).

*Primary Examiner* — Mary Ellen Bowman
(74) *Attorney, Agent, or Firm* — Merchant & Gould P. C.

(57) ABSTRACT

An area light may be provided. The area light may comprise an upper compartment, a lower compartment, and a lamp. The upper compartment may comprise an opening configured to receive a connector that may be configured to receive a cable. The lower compartment may be attached to the upper compartment. The lower compartment may comprise a connector block configured to receive conductors of the cable that supply electrical power. The lamp may be connected to the lower compartment. The lamp may be configured to receive the electrical power from the block.

19 Claims, 13 Drawing Sheets

(51) Int. Cl.
*F21V 23/04* (2006.01)
*F21V 31/00* (2006.01)

(56) References Cited

U.S. PATENT DOCUMENTS

| | | | |
|---|---|---|---|
| 2019/0113217 | A1 | 4/2019 | Lan |
| 2019/0212005 | A1 | 7/2019 | Lan |

* cited by examiner

AREA LIGHT

RELATED APPLICATIONS

This application is a National Stage Application of PCT/US2022/078451, filed on Oct. 20, 2022, which claims the benefit of and priority to U.S. Provisional patent application Ser. No. 63/270,161, filed Oct. 21, 2021, the subject matter of which are incorporated herein by reference in their entireties. To the extent appropriate, a claim of priority is made to each of the above disclosed applications.

TECHNICAL FIELD

The present disclosure relates generally to portable area lighting.

BACKGROUND

Lighting or illumination is the deliberate use of light to achieve practical or aesthetic effects. Lighting includes the use of both artificial light sources like lamps and light fixtures, as well as natural illumination by capturing daylight. Daylighting (using windows, skylights, or light shelves) is sometimes used as the main source of light during daytime in buildings. This can save energy in place of using artificial lighting, which represents a major component of energy consumption in buildings. Proper lighting can enhance task performance, improve the appearance of an area, or have positive psychological effects on occupants.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
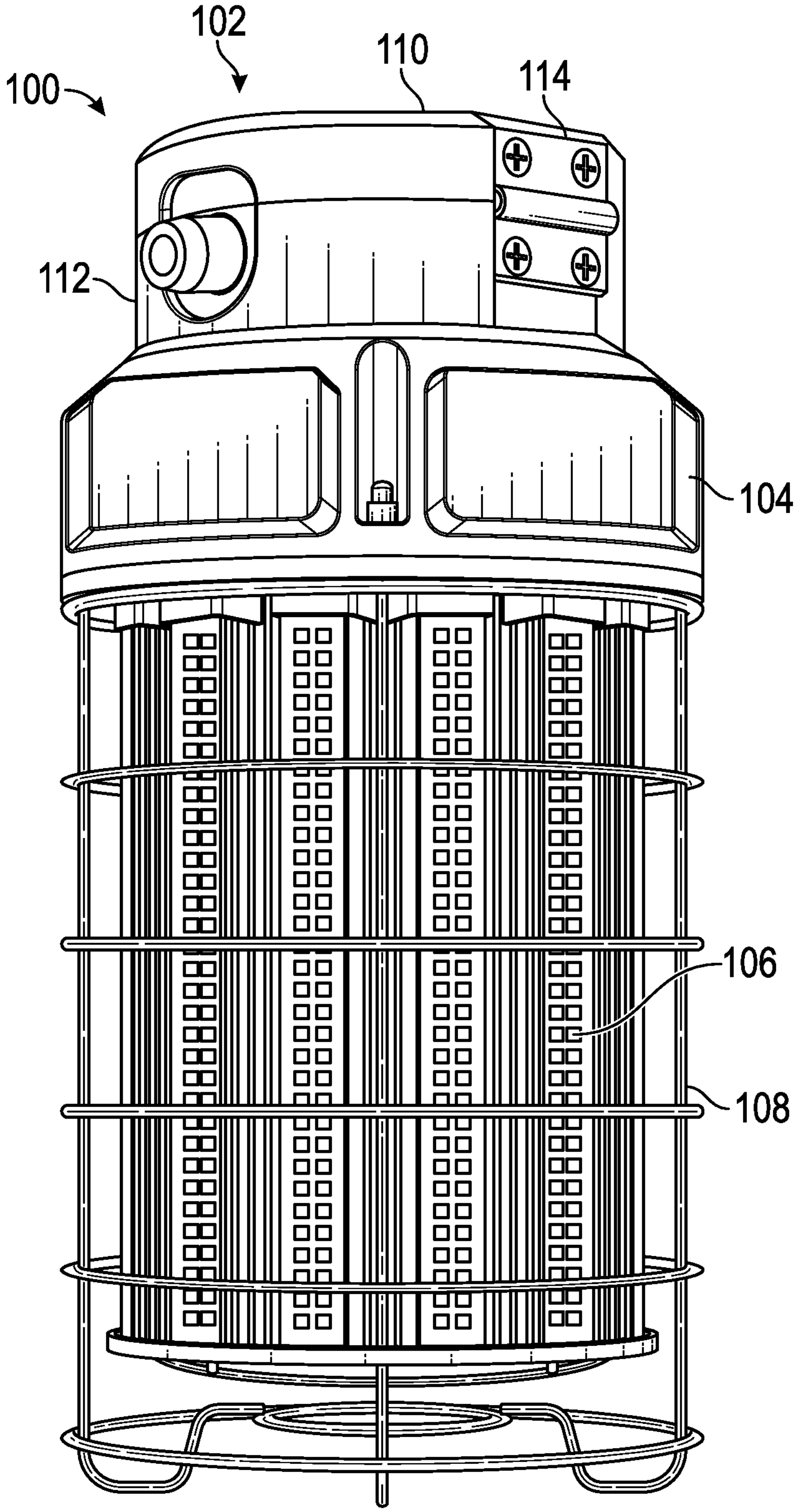
FIG. 1A, FIG. 1B, and FIG. 1C show various views of an area light.

An area light may be provided. The area light may comprise an upper compartment, a lower compartment, and a lamp. The upper compartment may comprise an opening configured to receive a connector that may be configured to receive a cable. The lower compartment may be attached to the upper compartment. The lower compartment may comprise a connector block configured to receive conductors of the cable that supply electrical power. The lamp may be connected to the lower compartment. The lamp maybe configured to receive the electrical power from the block.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Portable area lights have been developed to assist workers in the field. These workers may include first responders (i.e., police and firefighters), utility workers, and construction workers for example. In some situations it may be desirable to have area lighting that illuminates an area so that many workers can carry out various tasks such as construction work indoors or electrical work at night.

Figure 1B:
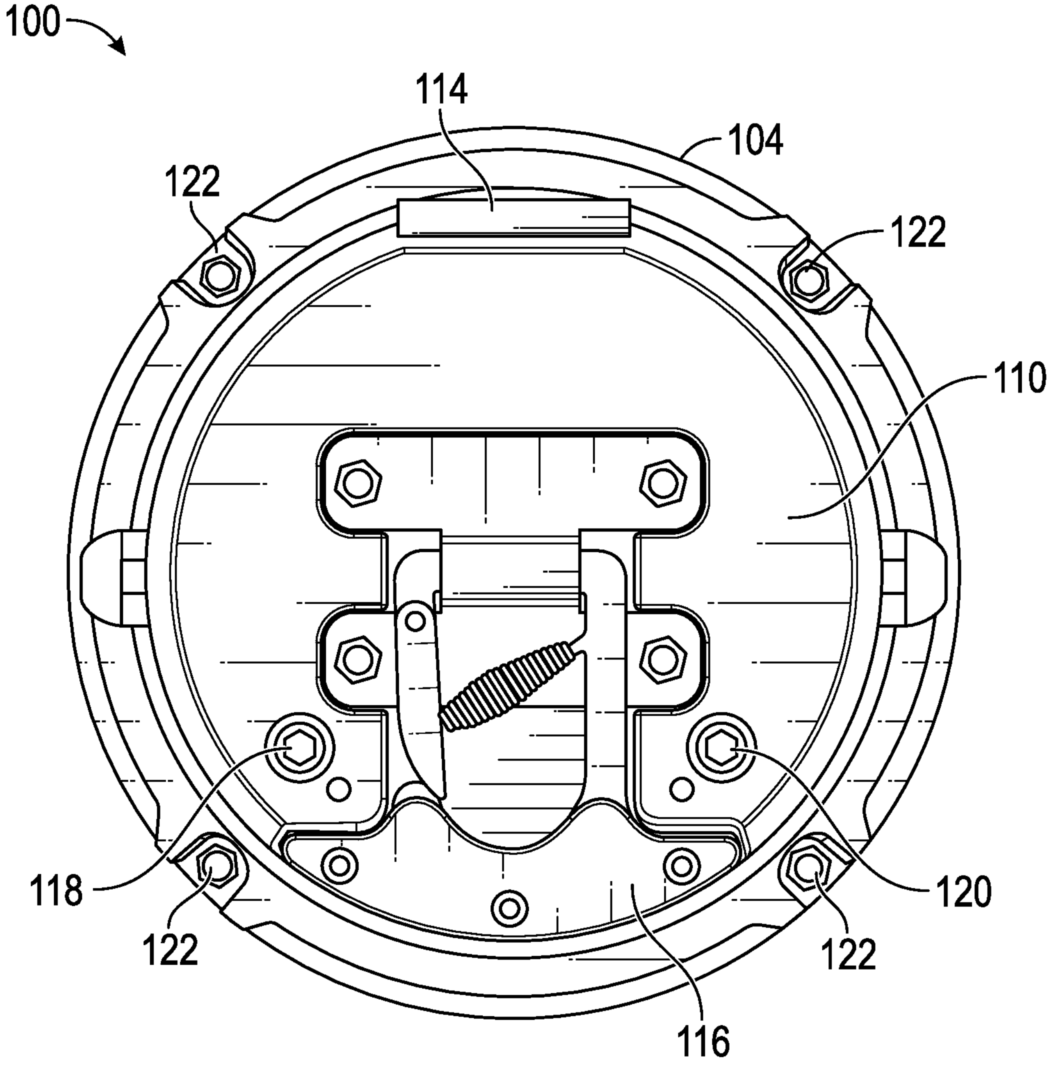
Figure 1C:
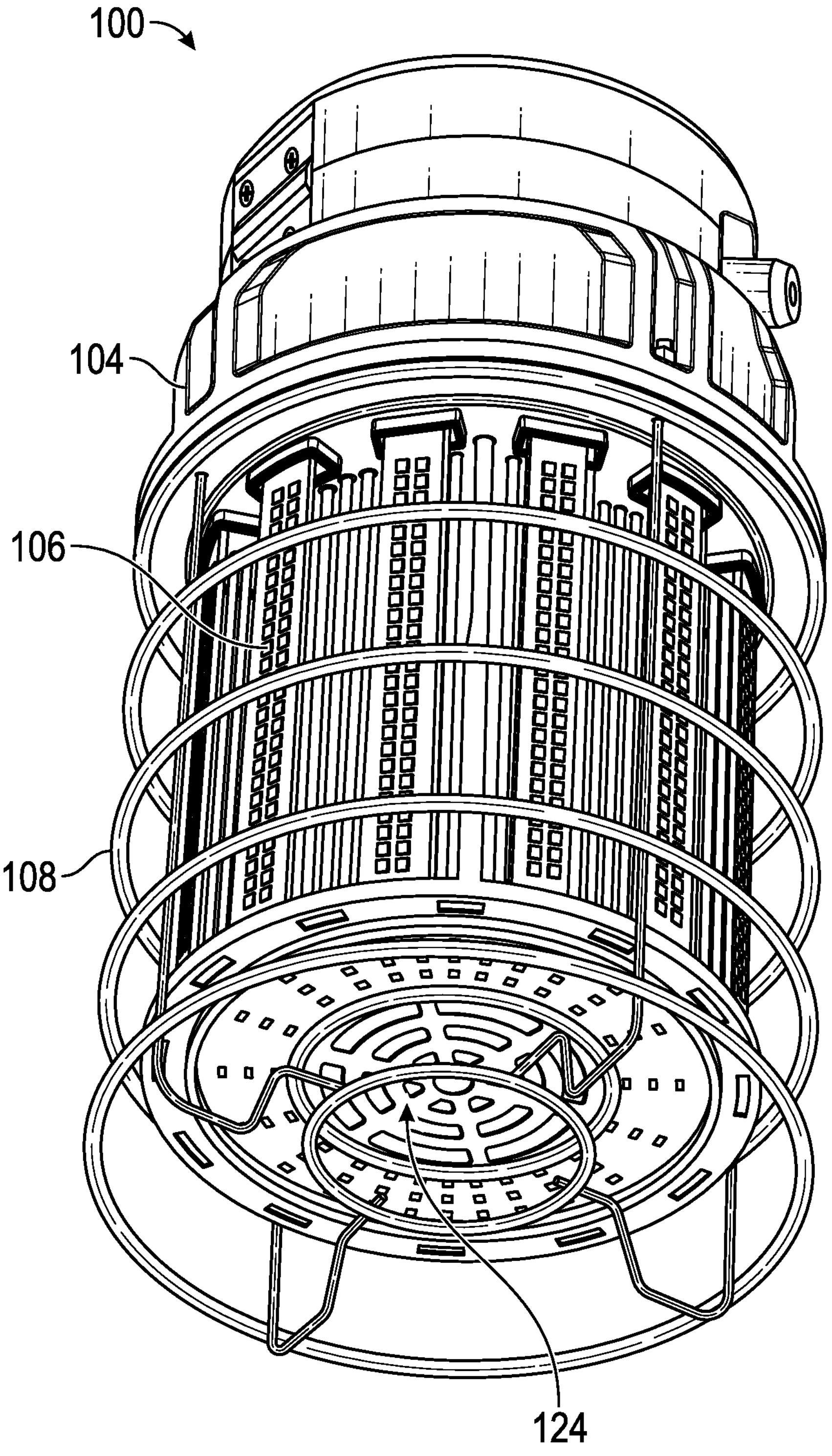

FIG. 1A, FIG. 1B, and FIG. 1C show various views of an area light 100. FIG. 1A shows a side view of area light 100, FIG. 1B shows a top view of area light 100, and FIG. 1C shows a bottom view of area light 100. As shown in FIG. 1A, area light 100 may comprise an upper compartment 102, a lower compartment 104, a lamp 106, and a cage 108. Upper compartment 102 may comprise an upper compartment top portion 110, an upper compartment lower portion 112, and a hinge 114. As shown in FIG. 1A, upper compartment top portion 110 may be hingeably connected to upper compartment lower portion 112. Lamp 106 may comprise a plurality of Light Emitting Diode (LED) strips that may receive power from lower compartment 104. Heat sinks may be placed inside lamp 106 to aid in dissipating heat from the LED strips. Heat from the heat sinks may vent out of the bottom of lamp 106.

As shown in FIG. 1B, area light 100 may comprise a handle 116, a first fastener 118, a second fastener 120, and a plurality of upper cage attachment elements 122. As shown in FIG. 1B and described in greater detail below, handle 116 may be hingeably connected to upper compartment top portion 110 and may flip up to an open position and flip down to a closed position. While in the closed position, handle 116 may be flush with a top surface of upper compartment top portion 110. Fasteners (e.g., first fastener 118 and second fastener 120) may be locked to cause upper compartment top portion 110 to be attached to upper compartment lower portion 112. Conversely, the fasteners (e.g., first fastener 118 and second fastener 120) may be unlocked to cause upper compartment top portion 110 to be unattached from upper compartment lower portion 112 and allow upper compartment top portion 110 to hingeably swing via hinge 114 from upper compartment lower portion 112. The plurality of upper cage attachment elements 122 may comprise, but are not limited to, nuts and may attach cage 108 to lower compartment 104.

FIG. 1C shows a bottom view of area light 100. As shown if FIG. 1C, heat from the aforementioned heat sinks may vent out of the bottom of lamp 106 through a lamp vent 124.

Cage 108 may protect the perimeter and bottom of lamp 106. Furthermore, the bottom of cage 108 may provide a stand for area light 100 and allow area light 100 to stand on its own on a reasonably flat service.

Figure 2A:
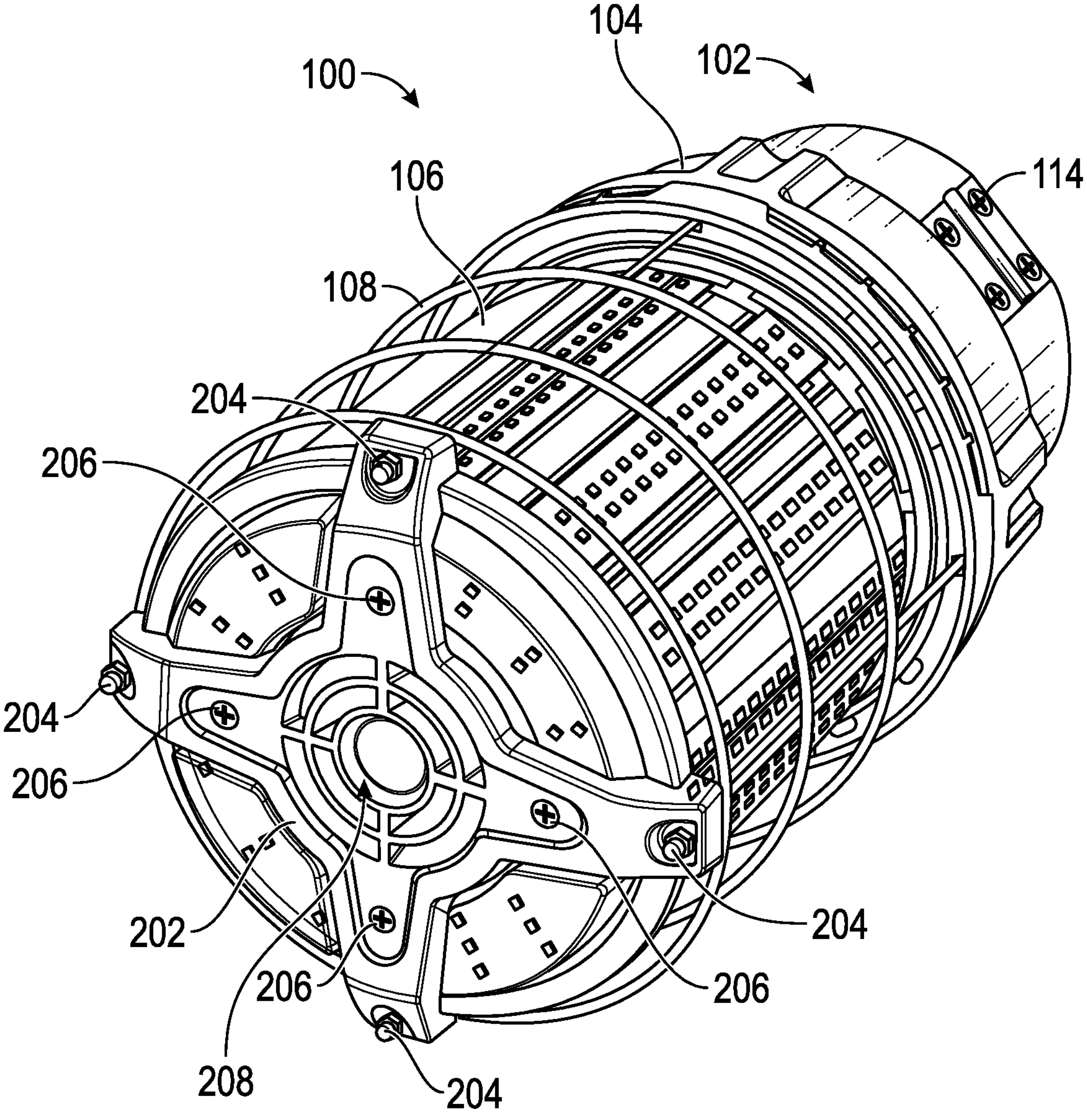
FIG. 2A and FIG. 2B show another embodiment of a bottom of a cage.
Figure 2B:
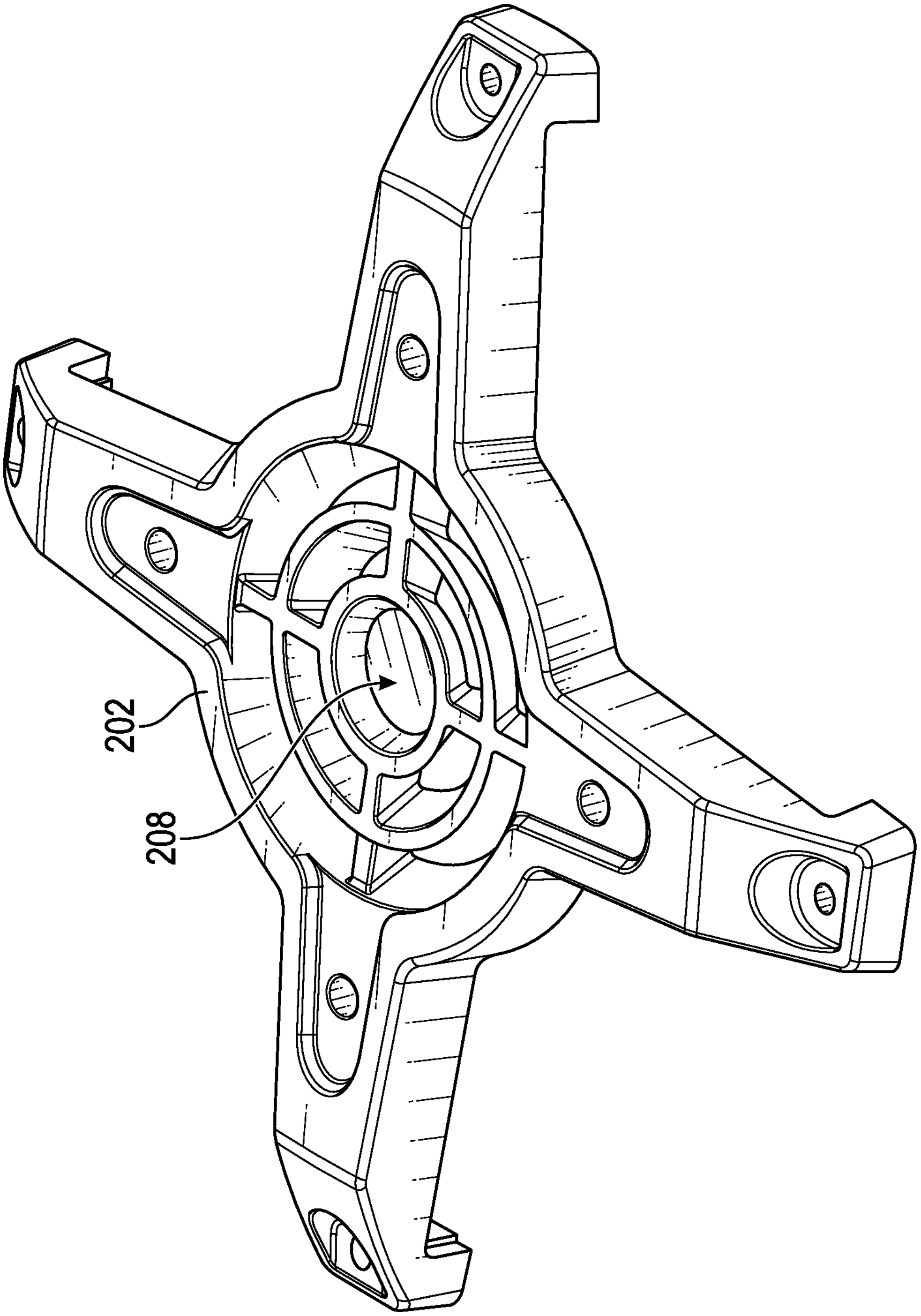

FIG. 2A and FIG. 2B show another embodiment of the bottom of area light 100. As shown in FIG. 2A, area light 100 may comprise a support cover 202, a plurality of lower cage attachment elements 204, and a plurality of lamp attachment elements 206. FIG. 2B shows support cover 202 in greater detail. Plurality of lower cage attachment elements 204 (e.g., nuts) may attach support cover 202 to cage 108. Plurality of lamp attachment elements 206 (e.g., screws) may attach support cover 202 to lamp 106. For example, plurality of lamp attachment elements 206 may attach to heat sinks disposed in lamp 106. Plurality of lamp attachment elements 206 may add further stability to lamp 106 by stabilizing the bottom end of lamp 106. In other words, lamp 106 may be stabilized at the top end by being attached to lower compartment 104 and may be stabilized at the bottom end by being attached to support cover 202 that may be attached to cage 108 that may be attached to lower compartment 104.

Support cover 202 may comprise a support cover vent 208 that may correspond to lamp vent 124. Heat from the aforementioned heat sinks may vent out of the bottom of lamp 106 through lamp vent 124 and pass through support cover vent 208. Furthermore, cage 108 may protect the perimeter of lamp 106 and support cover 202 may protect the bottom of lamp 106. Support cover 202 may provide a stand for area light 100 and allow area light 100 to stand on its own on a reasonably flat service.

Figure 3:
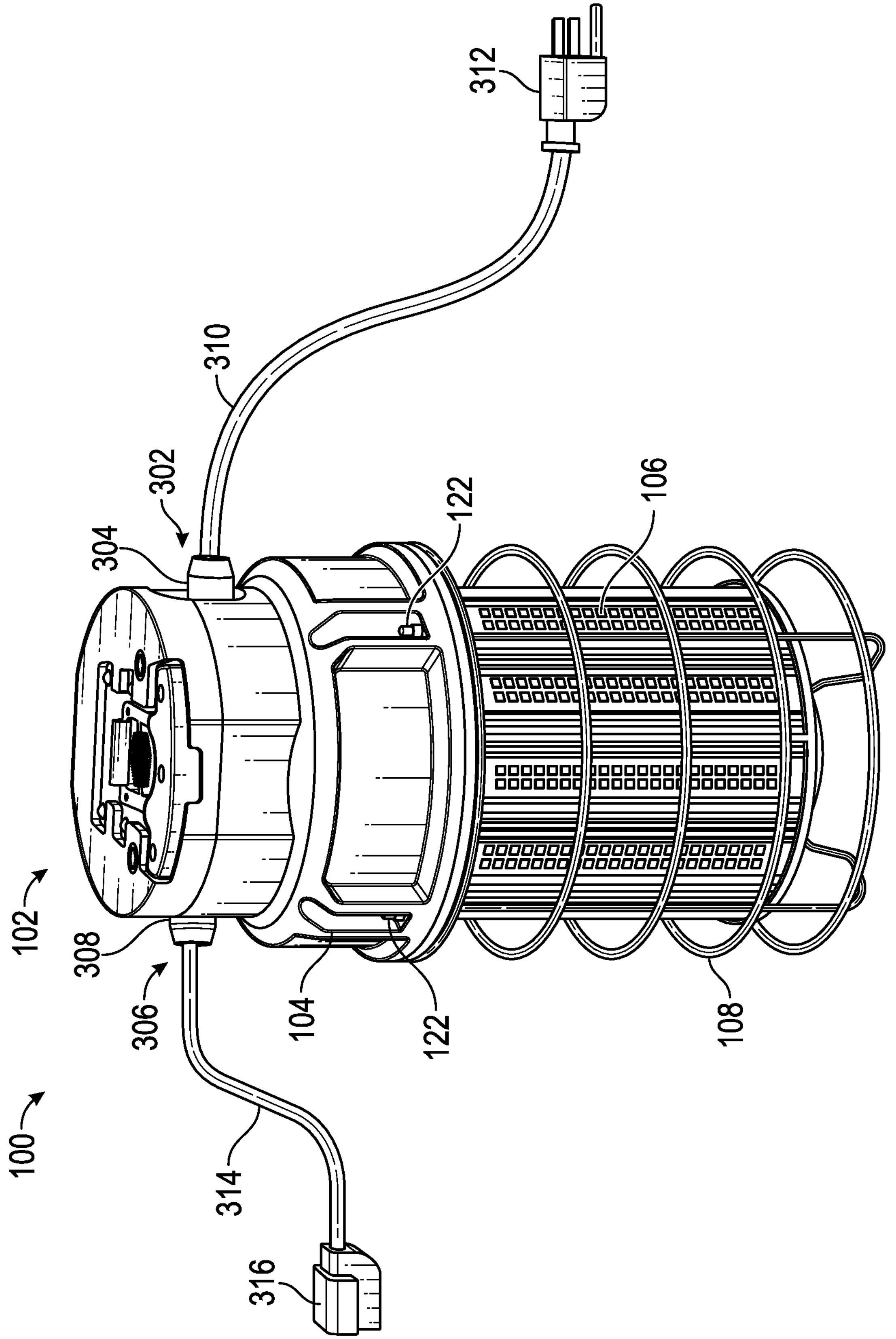
FIG. 3 shows an area light with cables wired into the area light.

FIG. 3 shows area light 100 with cables wired into area light 100. As shown in FIG. 3, area light 100 may comprise a first connector 302, a first opening 304, a first cable 310, and a first plug 312. First plug 312 may comprise any type plug capable of suppling or receiving electrical power and may be male or female. Area light 100 may further comprise a second connector 306, a second opening 308, a second cable 314, and a second plug 316. Second plug 316 may comprise any type plug capable of suppling or receiving electrical power and may be male or female.

First connector 302 may be placed in first opening 304. For example, first opening 304 may be threaded and first connector 302 may be screwed into first opening 304. First cable 310 may enter upper compartment 102 through first connector 302. First cable 310 may provide or receive power from first plug 312. Similarly, second connector 306 may be placed in second opening 308. For example, second opening 308 may be threaded and second connector 306 may be screwed into second opening 308. Second cable 314 may enter upper compartment 102 through second connector 306. Second cable 314 may provide or receive power from second plug 316. Other area lights (i.e., other than area light 100) may be connected to first plug 312 or second plug 316 thus “daisy changing” area lights together consistent with embodiments of the disclosure.

Figure 4A:
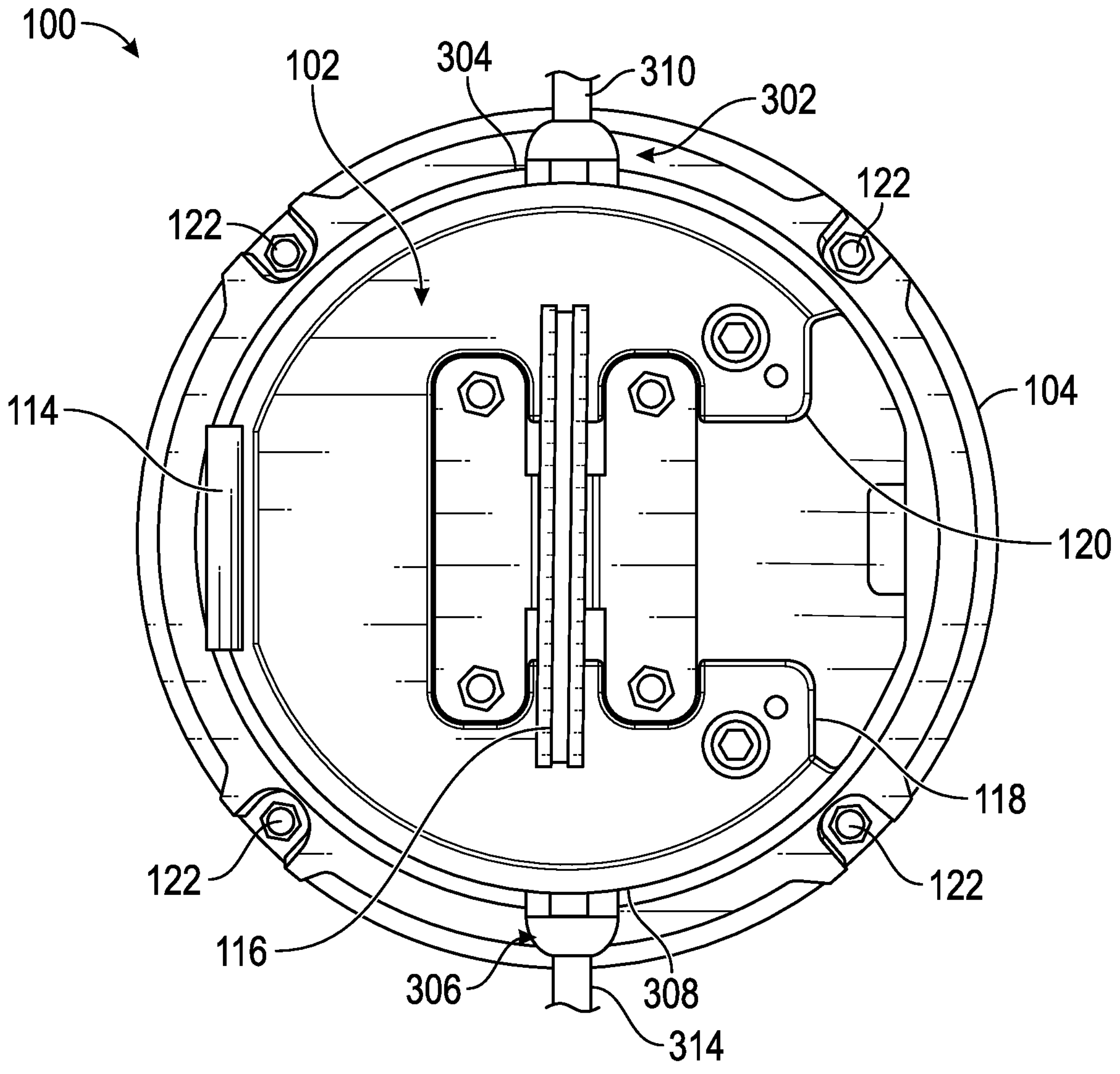
FIG. 4A and FIG. 4B show an area light with cables wired into the area light in more detail.
Figure 4B:
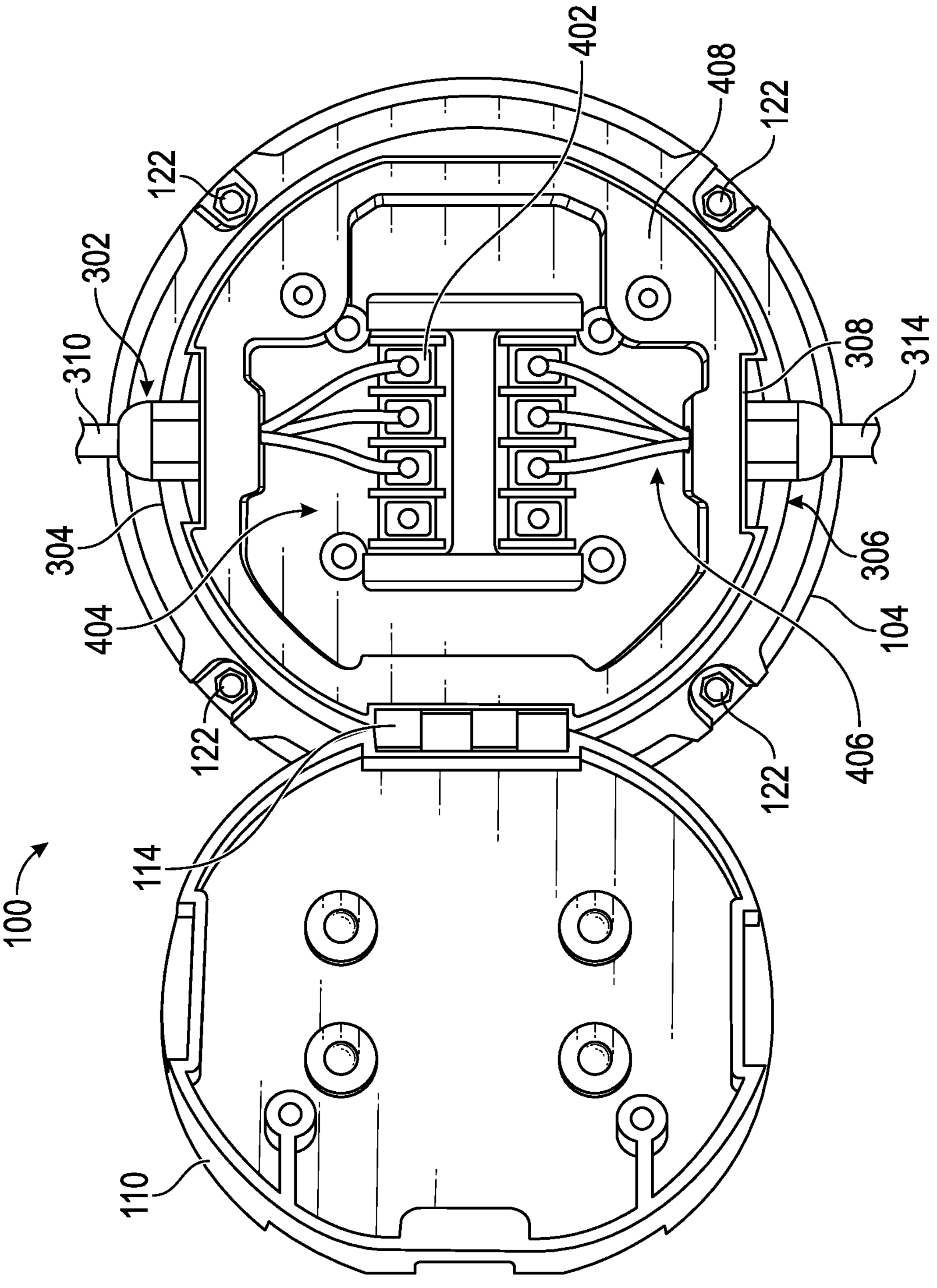

FIG. 4A and FIG. 4B show area light 100 in more detail with cables (e.g., first cable 310 and second cable 314) wired into area light 100. As shown in FIG. 4A, upper compartment top portion 110 may be flipped down in a closed position and the fasteners (e.g., first fastener 118 and second fastener 120) may be locked to cause upper compartment top portion 110 to be attached to upper compartment lower portion 112. In FIG. 4A, handle 116 may be flipped up and shown in the open position. Conversely, as shown in FIG. 4B, upper compartment top portion 110 may be flipped up in an open position. The fasteners (e.g., first fastener 118 and second fastener 120) may have been unlocked to cause upper compartment top portion 110 to be unattached from upper compartment lower portion 112 and allow upper compartment top portion 110 to hingeably swing via hinge 114 with upper compartment lower portion 112.

As shown in FIG. 4B, area light 100 may comprise a connector block 402, first cable conductors 404, second cable conductors 406, and a gasket 408. Connector block 402 may be used to connect first cable conductors 404 of first cable 310 with second cable conductors 406 of second cable 314. For example, a line conductor of first cable conductors 404 may be attached to a first line post on connector block 402, a neutral conductor of first cable conductors 404 may be attached to a first neutral post on connector block 402, and a ground conductor of first cable conductors 404 may be attached to a first ground post on connector block 402. Similarly, a line conductor of second cable conductors 406 may be attached to a second line post on connector block 402, a neutral conductor of second cable conductors 406 may be attached to a second neutral post on connector block 402, and a ground conductor of second cable conductors 406 may be attached to a second ground post on connector block 402.

The first line post and the second line post may be electrically connected, the first neutral post and the second neutral post may be electrically connected, and first ground post and the second ground post may be electrically connected. In this way, connector block 402 may electrically connect the individual conductors (i.e., first cable conductors 404) of first cable 310 with the corresponding individual conductors (i.e., second cable conductors 406) of second cable 314. Consistent with embodiments of the disclosure, connector block 402 may comprise posts in addition to the aforementioned first and second line posts, the aforementioned first and second neutral posts, and the aforementioned first and second ground posts.

First cable conductors 404 and second cable conductors 406 may be insulated and may comprise, but are not limited to, American Wire Gage (AWG) 12 Thermoplastic High Heat-resistant Nylon-coated (THHN) copper wire with colored insulation. Ground wires of first cable conductors 404 and second cable conductors 406 may comprise, but are not limited to, AWG 12 bare or insulated copper wire. First cable conductors 404 and second cable conductors 406 are not limited to solid copper and may be stranded or may comprise any conductive metal or non-metal material. Furthermore, first cable conductors 404 and second cable conductors 406 are not limited to AWG 12 THHN and may comprise other sizes and types. A jacket around first cable 310 or second cable 314 may comprise, but is not limited to, a non-metallic material such as Polyvinyl Chloride (PVC).

Gasket 408 may be disposed between upper compartment top portion 110 and upper compartment lower portion 112. Upper compartment top portion 110 may be flipped down in a closed position and the fasteners (e.g., first fastener 118 and second fastener 120) may be locked to cause upper compartment top portion 110 to be attached to upper compartment lower portion 112. Gasket 408 may comprise a waterproof gasket and may inhibit water seepage between upper compartment top portion 110 and upper compartment lower portion 112.

Figure 5:
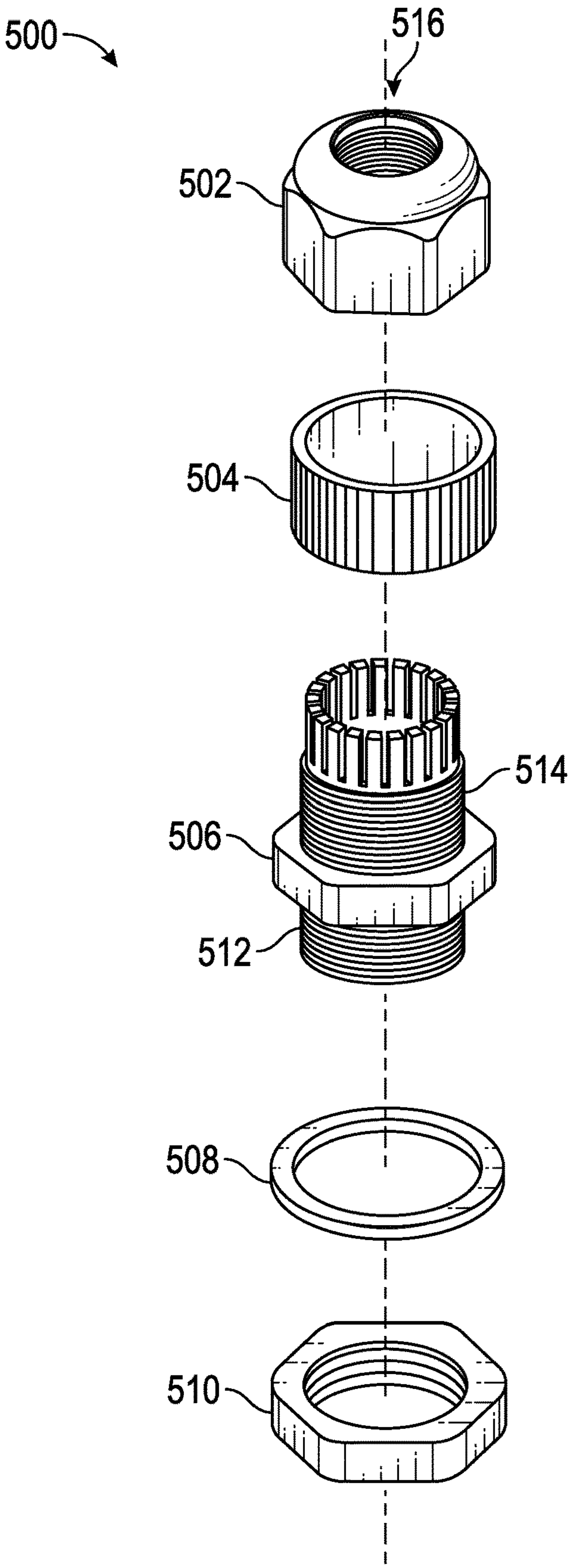
FIG. 5 shows a gland connector.

FIG. 5 shows a gland connector 500. As shown in FIG. 5, gland connector 500 may comprise a sealing nut 502, a seal 504, a body 506, a washer 508, and a lock nut 510. Body 506 may comprise lower threads 512 and upper threads 514. Gland connector 500 may further comprise an opening 516. When gland connector 500 is used as first connector 302 or second connector 306, lower threads 512 may be screwed into a threaded first opening 304 or a threaded second opening 308. Optional lock nut 510 may be placed on lower threads 512 after gland connector 500 is screwed into threaded first opening 304 or threaded second opening 308. First cable 310 or second cable 314 may be inserted into opening 516 and may be terminated on connector block 402 as described above with respect to FIG. 4A and FIG. 4B. Sealing nut 502 may then be tightened on to upper threads 514 in order to inhibit water seepage between the cable (e.g., first cable 310 or second cable 314) and gland connector 500 (e.g., first connector 302 or second connector 306).

Figure 6A:
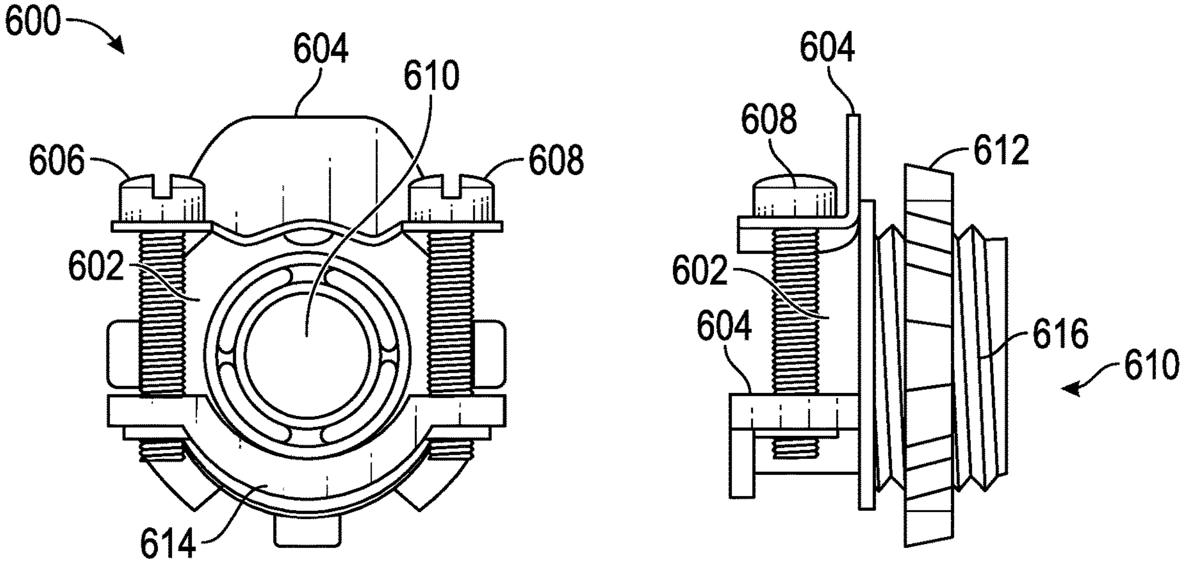
FIG. 6A and FIG. 6B show a clamp connector.
Figure 6B:
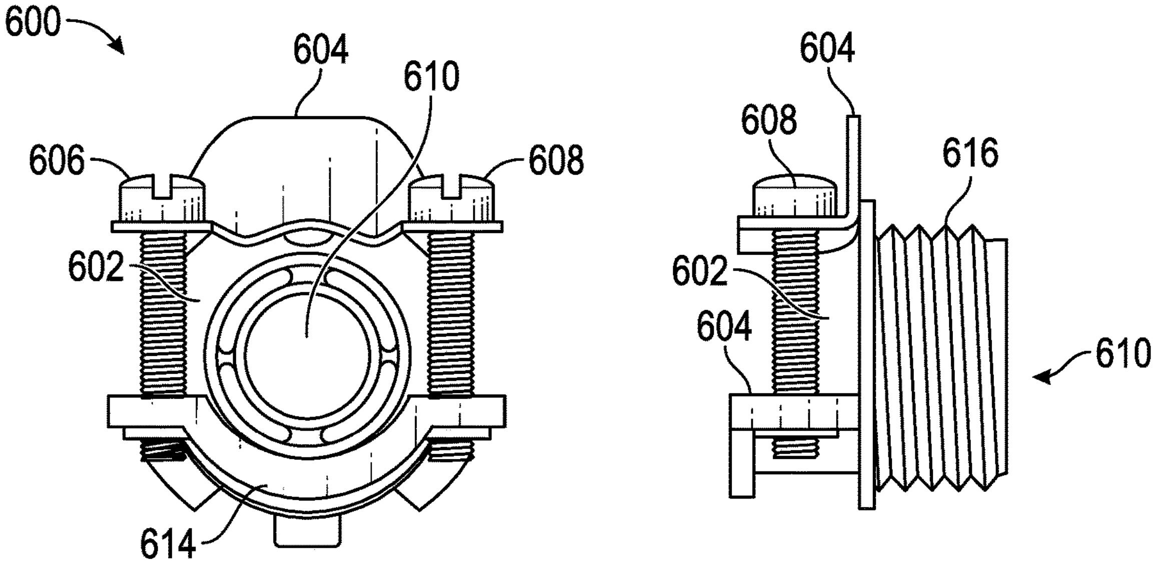

FIG. 6A and FIG. 6B show a clamp connector 600. As shown in FIG. 6A and FIG. 6B, clamp connector 600 may comprise a main body 602, a clamp 604, a first attachment element 606, a second attachment element 608, an opening 610, and a lock nut 612. Main body 602 may comprise a saddle 614 and threads 616. When clamp connector 600 is used as first connector 302 or second connector 306, threads 616 may be screwed into a threaded first opening 304 or a threaded second opening 308. Optional lock nut 612 may be placed on threads 616 after clamp connector 600 is screwed into threaded first opening 304 or threaded second opening 308. First cable 310 or second cable 314 may be inserted into opening 610 and may be terminated on connector block 402 as described above with respect to FIG. 4A and FIG. 4B. First attachment element 606 and second attachment element 608 may then be tightened in order to cause clamp 604 to hold the cable (e.g., first cable 310 or second cable 314) against saddle 614 in clamp connector 600 (e.g., first connector 302 or second connector 306).

Consistent with embodiments of the disclosure, with clamp connector 600, the cable (e.g., first cable 310 or second cable 314) may comprise a Non-Metallic (NM) sheathed cable (e.g., NM-B) for both exposed and concealed work in normally dry locations at temperatures not to exceed 90° C. (with ampacity limited to that for 60° C. conductors) as specified in the National Electrical Code (NEC). In other embodiments with clamp connector 600, the cable (e.g., first cable 310 or second cable 314) may comprise a Metal Clad (MC) cable that may be sheathed with a metallic coating. MC cable may comprise an assembly of one or more insulated conductors, enclosed with an armor of metal tape or a metallic sheath. NM-B and MC are examples and other type cables may be used consistent with embodiments of the disclosure.

Figure 7A:
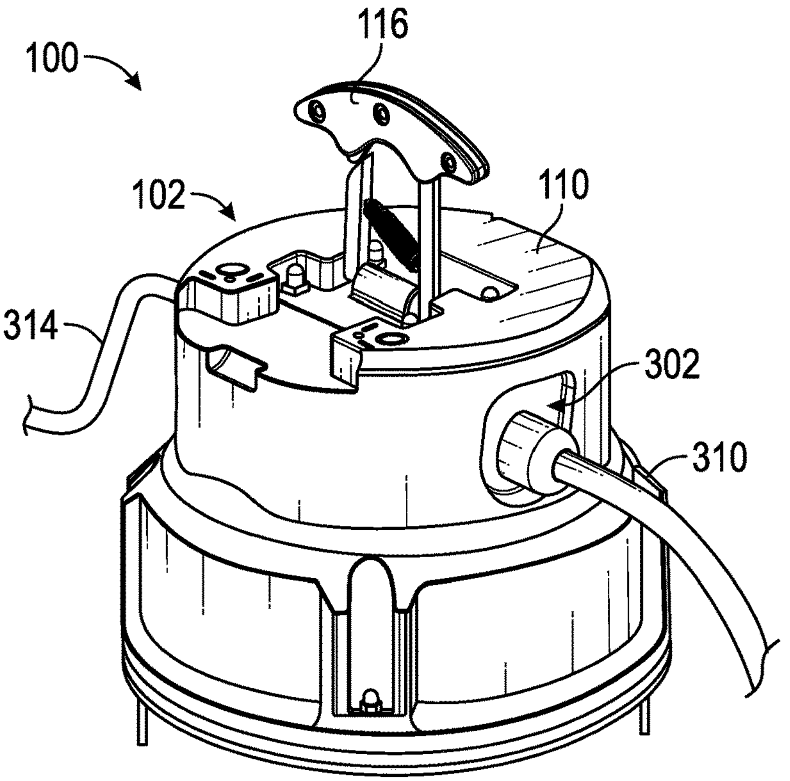
FIG. 7A and FIG. 7B show an area light with a handle.
Figure 7B:
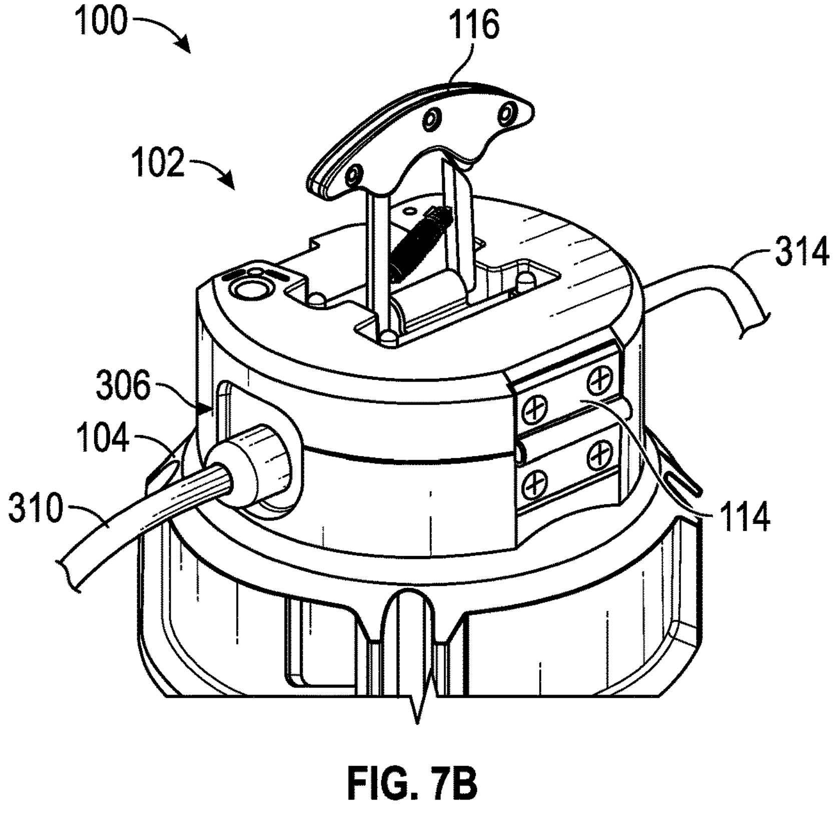

FIG. 7A and FIG. 7B show area light 100 with handle 116. Handle 116 may be hingeably connected to upper compartment top portion 110 and may flip up to an open position (e.g., as shown in FIG. 7A and FIG. 7B) and flip down to a closed position where it may be flush with a top surface of upper compartment top portion 110. While in the open or up position, area light 100 may be carried, moved, and positioned by a user via handle 116 and handle 116 may be attached to an element such as a carrier line or a rope as described in greater detail below.

Figure 8:
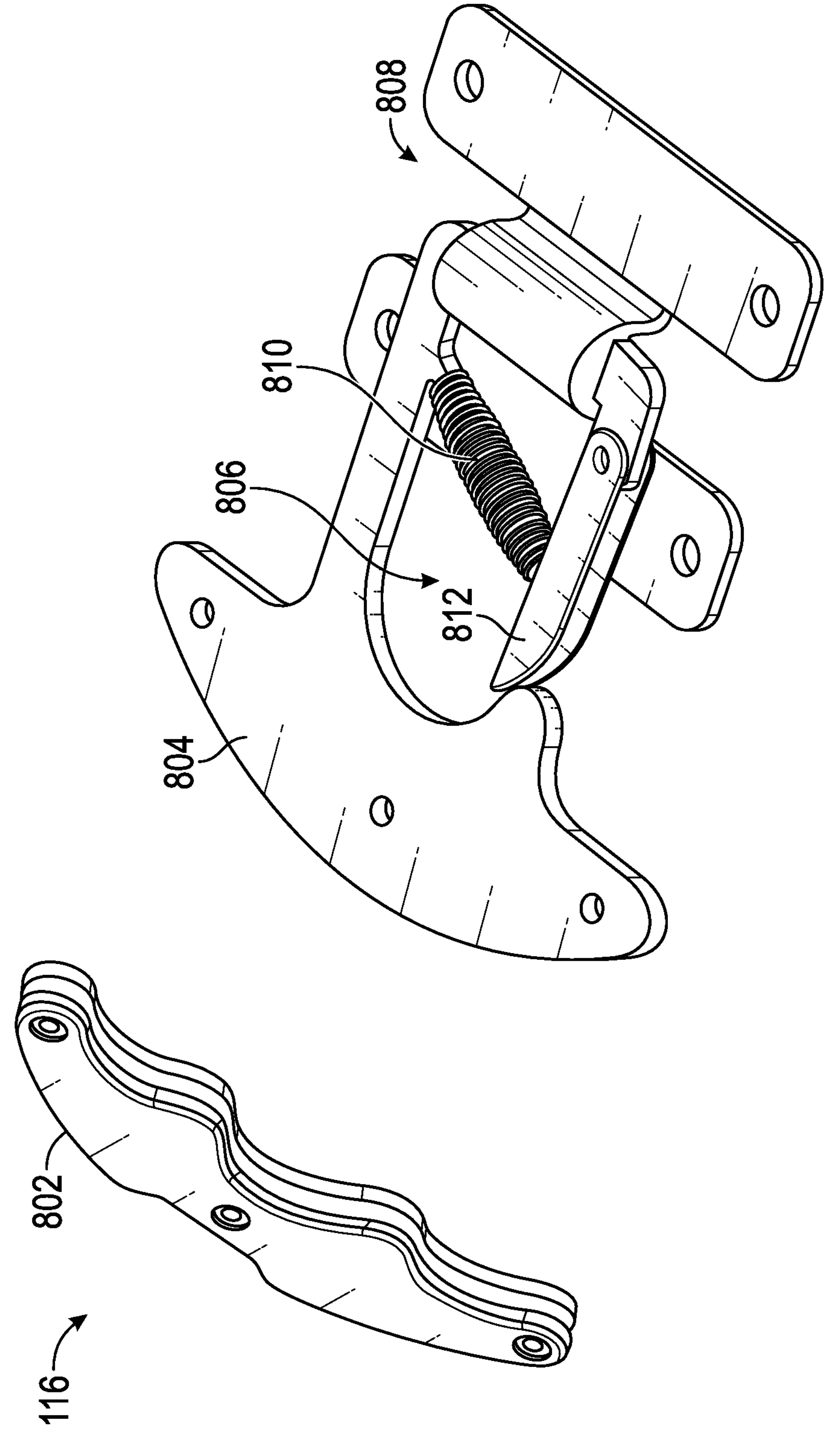
FIG. 8 shows a handle in more detail.

FIG. 8 shows handle 116 in more detail. As shown in FIG. 8, handle 116 may comprise a handle cover 802, a handle plate 804, a hook 806, a handle hinge 808, a spring 810, and a latch 812. Handle cover 802 may be placed over handle plate 804 and attached to it. Handle cover 802 may provide a more comfortable carrying experience for a user who may be carrying area light 100. Handle hinge 808 may allow handle 116 to hingeably flip between the aforementioned open and closed positions.

Consistent with embodiments of the disclosure, hook 806 may be used to attached or otherwise connect area light 100 to an element above a work area. For example, a carrier line or a rope may be strung above the work area. The user may cause latch 812 to pushed back into hook 806 thus compressing spring 810. Then, once carrier line or rope is in hook 806, spring 810 may decompress forcing latch 812 back to its original position. In this way, the carrier line or the rope may be retained in hook 806. According, area light 100 may be safely secured above in order to illuminate the work area.

Figure 9:
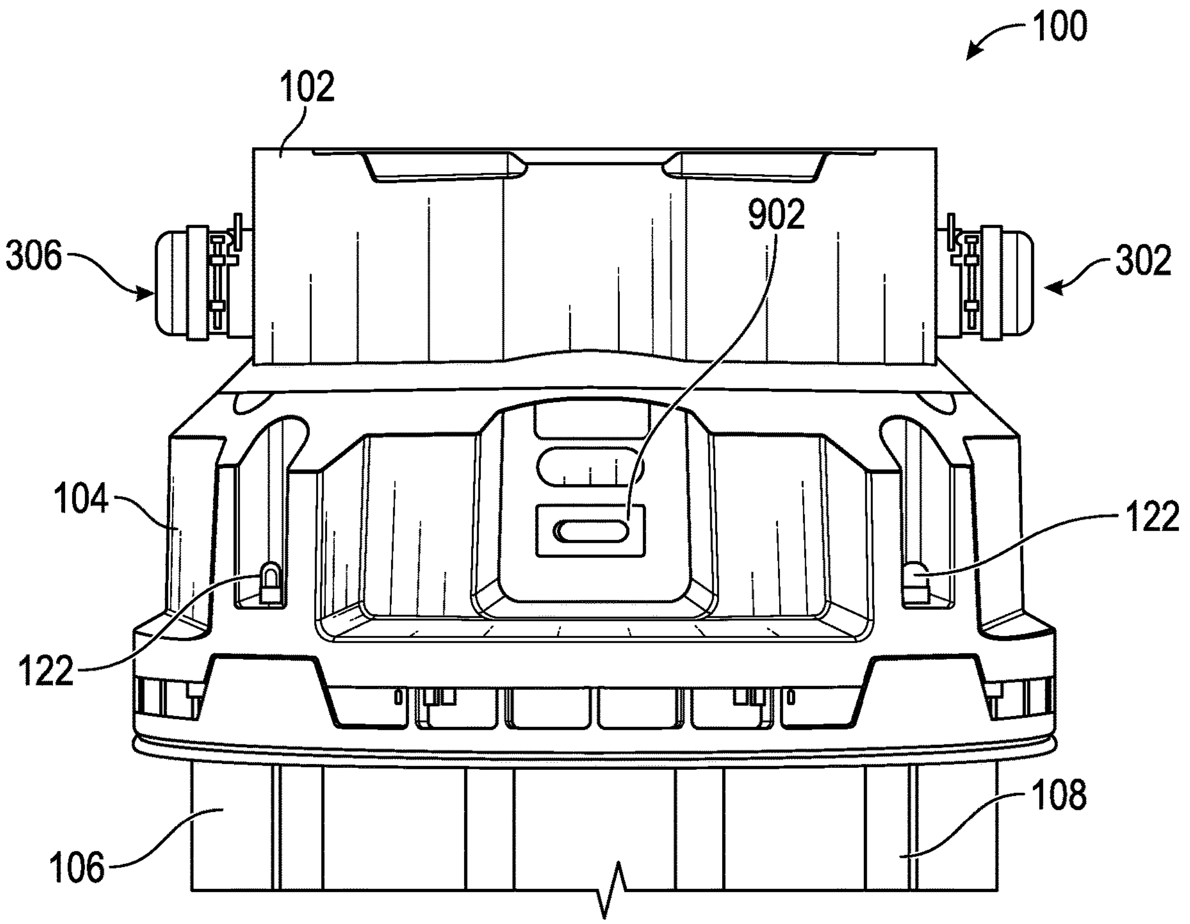
FIG. 9 shows an area light with a switch.

FIG. 9 shows area light 100 with a switch 902. As shown in FIG. 9, switch 902 may be placed in an "on" position that may cause power to be fed to lamp 106 thus illuminating lamp 106. Conversely, switch 902 may be placed in an "off" position that may cause power to be cut off to lamp 106 thus causing lamp 106 not to illuminate.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A system comprising:
- an upper compartment comprising an upper compartment top portion and an upper compartment lower portion, the upper compartment top portion being hingeably connected to the upper compartment lower portion, wherein the upper compartment lower portion comprises:
  - a first opening configured to receive a first connector, the first connector configured to receive a first cable, and
  - a second opening configured to receive a second connector, the second connector configured to receive a second cable;
- a lower compartment attached to the upper compartment, the lower compartment comprising a connector block configured to connect first cable conductors of the first cable to second cable conductors of the second cable, wherein one of the first cable and the second cable supplies electrical power; and
- a lamp connected to the lower compartment, the lamp configured to receive the electrical power from the block.

2. The system of claim 1, wherein the first opening is disposed on a first side of the upper compartment.

3. The system of claim 1, wherein the first opening comprises a first treaded opening.

4. The system of claim 3, wherein the first connector screws into the first treaded opening.

5. The system of claim 4, wherein the first connector comprises a gland connector.

6. The system of claim 4, wherein the first connector comprises a clamp connector configured to receive the first cable comprising one of a Metal Clad (MC) cable and a Non-Metallic (NM) cable.

7. The system of claim 1, wherein the upper compartment top portion further comprises a fastener configured to attach the upper compartment top portion to the upper compartment bottom portion.

8. The system of claim 1, further comprising a waterproof gasket disposed between the upper compartment top portion and the upper compartment bottom portion.

9. The system of claim 1, further comprising a handle disposed on the upper compartment top portion.

10. The system of claim 9, wherein the handle further comprises a hook.

11. The system of claim 10, wherein the hook further comprises a spring loaded latch.

12. The system of claim 1, further comprising a cage around the lamp.

13. The system of claim 12, wherein the cage is connected to the lower compartment.

14. The system of claim 12, wherein the cage comprises a support cover at the bottom the cage.

15. The system of claim 14, wherein the support cover is connected to the lamp.

16. The system of claim 1, further comprising a switch disposed in the lower compartment configured to switch power to the lamp on and off.

17. The system of claim 1, wherein at least one of the first cable and the second cable is connectable to another system to supply the electrical power from the system to the another system.

18. The system of claim 1, the first cable comprises a male plug end and the second cable comprises a female plug end.

19. The system of claim 1, wherein:

a line conductor of the first cable conductors is attached to a first line post on the connector block;

a neutral conductor of the first cable conductors is attached to a first neutral post on the connector block;

a ground conductor of the first cable conductors is attached to a first ground post on the connector block;

a line conductor of the second cable conductors is attached to a second line post on the connector block;

a neutral conductor of the second cable conductors is attached to a second neutral post on the connector block;

a ground conductor of the second cable conductors is attached to a second ground post on the connector block;

the first line post and the second line post are electrically connected;

the first neutral post and the second neutral post are electrically connected; and the first ground post and the second ground post are electrically connected.

* * * * *